(12) United States Patent
Anderson

(10) Patent No.: US 6,789,955 B2
(45) Date of Patent: Sep. 14, 2004

(54) FIBER-PIGTAILED ASSEMBLY

(75) Inventor: Duwayne R. Anderson, St. Helens, OR (US)

(73) Assignee: Tektronix, Inc., Beaverton, OR (US)

(*) Notice: Subject to any disclaimer, the term of this patent is extended or adjusted under 35 U.S.C. 154(b) by 43 days.

(21) Appl. No.: 10/058,585

(22) Filed: Jan. 24, 2002

(65) Prior Publication Data

US 2003/0138218 A1 Jul. 24, 2003

(51) Int. Cl.$^7$ ............................................. G02B 6/36
(52) U.S. Cl. ............................ 385/88; 385/90; 385/92
(58) Field of Search ............................. 385/88, 89, 90, 385/91, 92, 11, 25, 51, 38, 139

(56) References Cited

U.S. PATENT DOCUMENTS

| | | | | |
|---|---|---|---|---|
| 4,165,496 | A | * 8/1979 | Di Domenico et al. | 385/48 |
| 5,850,495 | A | * 12/1998 | O'Donnell | 385/92 |
| 5,857,050 | A | * 1/1999 | Jiang et al. | 385/92 |
| 6,394,666 | B1 | * 5/2002 | Minamino et al. | 385/90 |
| 6,430,338 | B1 | * 8/2002 | Schmidt | 385/31 |
| 2001/0048070 | A1 | * 12/2001 | He et al. | 250/225 |

* cited by examiner

*Primary Examiner*—Michael P. Stafira
*Assistant Examiner*—Juan D Valentin, II

(74) *Attorney, Agent, or Firm*—Francis I. Gray

(57) ABSTRACT

A fiber-pigtailed assembly for an optical detector with low back reflection and minimal polarization-dependent responsivity has a detector surface mounted adjacent a beveled end of a fiber pigtail such that the detector surface is tilted and rotated with respect to the beveled end of the fiber pigtail. Also an external optical fiber may be coupled to the fiber pigtail with low back reflection and minimal polarization-dependent responsivity by having an input ferrule at the end of the external optical fiber, the end being beveled; by having an intermediate ferrule at a coupling end of the fiber pigtail, the coupling end being beveled while the other end of the ferrule is beveled by the same amount but approximately orthogonal to the coupling end; and by having an output ferrule on the fiber pigtail adjacent to the intermediate ferrule, the end of the output ferrule adjacent to the intermediate ferrule being beveled. The ferrules are maintained in position so that the beveled ends of the intermediate ferrule are parallel to the corresponding beveled ends of the input and output ferrules and there is a gap between the input and intermediate ferrules. The beveled ends of the ferrules at both the coupler and detector ends of the fiber pigtail introduce fixed amounts of polarization-dependent responsivity while reducing back reflection, while the tilt of the detector surface at the detector end and the opposite approximately orthogonal bevel of the intermediate ferrule at the coupler end compensate and essentially eliminate such polarization-dependent responsivity.

11 Claims, 4 Drawing Sheets

FIBER-PIGTAILED ASSEMBLY

BACKGROUND OF THE INVENTION

The present invention relates to coupling light onto an optical detector, and more particularly to a fiber-pigtailed assembly that couples light from an optical fiber onto an optical detector having a relatively large area such that the polarization-dependent responsivity and back reflection are very low.

Polarization-dependent responsivity (PDR) is the ratio of the maximum photo-current divided by the minimum photo-current generated in an optical detector for a given flux of photons over all possible states of polarization and correlates to polarization-dependent loss (PDL). Ideally PDR is zero dB. Reflectivity is the flux of photons that travel backward to the optical source divided by the flux of photons impinging upon the optical detector, usually expressed in dB. Ideally the reflectivity is minus infinite dB.

Low back reflection and low PDR tend to be difficult to achieve simultaneously. Usually methods that improve one make the other worse. For some types of test equipment that measure the characteristics of fiber-optic components it is important to have an optical detector with both low reflectivity and low PDR. Typical requirements for back reflection and PDR are −45 dB and 0.03 dB, respectively. Extraordinary requirements are −65 dB and 0.003 dB, respectively.

While these requirements are important for test-and-measurement (T&M) applications, they are not typically necessary for the majority of people who use fiber-pigtailed detectors. Since T&M applications are a small percentage of the overall market for such devices, it is often difficult or impossible to find a company that can or will build such a device for the limited T&M market.

A common method of reducing back reflection is to use various optical coatings that are designed for low reflectance. These coatings are based on interference, however, and so exhibit wavelength dependence. Even at the optimized wavelength, coatings have difficulty achieving the best-desired specifications. For applications involving wide-band detection, i.e., over many hundreds of nanometers of wavelength, the performance of such coatings is a serious limitation.

Another common method of achieving low back reflection is to tilt the surface of the optical detector relative to the input fiber. The resulting reflected light is thus angled such that it fails to couple to guided fiber modes and is quickly lost. Unlike coatings, tilted surfaces are inherently broadband, resulting in very low reflectivity. Tilting the optical surface, however, introduces PDR. This is largely the result of the fact that the power in the reflected light from a tilted surface is a function of the state of polarization. This is often the source of the low PDR/low back reflection trade off.

In T&M applications using photodetectors to measure optical power requirements typically calls for low back reflection to help avoid instabilities that result from feedback into the laser source, while also calling for low PDR. The problem is that the optimum way of achieving low back reflection, as indicated above, is to use tilted surfaces, yet tilted surfaces introduce polarization dependencies. This problem is amplified in pigtailed optical detectors because the optical pigtail acts like a weak Fabry-Perot resonator, with a birefringent medium (the fiber itself) between mirrors (the reflective ends of the fiber pigtail).

In a Fabry-Perot resonator without birefringence between the mirrors the transmitted and reflected fields add coherently to produce the characteristic wavelength-dependent transmission of these resonators. The introduction of a birefringent material between the mirrors causes relative rotation between reflection/transmission terms that ordinarily would add. However rotation of these terms interferes with their ability to coherently mix, resulting in modulation of the transmitted optical power, i.e., the modulation is a function of the birefringence and wavelength. Thus a simple component made of parts that individually have no polarization-dependent loss (PDL) may exhibit significant PDL. When pigtailed to the optical detector, the fiber assembly and detector together constitute a device that may show considerable PDR. Assemblies with normal incidence, where PDL might be expected to be least, actually show more polarization dependence than those with tilted surfaces. This is because the PDL of the weak Fabry-Perot resonator inherent in the fiber pigtail is amplified by the relatively strong reflection at normal incidence.

What is desired is a fiber-pigtail assembly for an optical detector that provides both low PDR and low back reflection sufficient to meet or exceed even extraordinary specifications.

BRIEF SUMMARY OF THE INVENTION

Accordingly the present invention provides a fiber-pigtailed assembly for an optical detector that has both low polarization-dependent responsivity (PDR) and low back reflection. The end of a fiber pigtail is held in a ferrule near the detector and is beveled at an angle so that reflections from the ferrule beveled end are not coupled into guided modes back to a light source. The surface of the detector is tilted in a different plane from that of the bevel at the end of the ferrule. Finally the planes of incidence at the end of the ferrule and at the detector are defined in such a way—nearly orthogonal—that the PDR from these surfaces cancel each other. The PDL is essentially eliminated by rotation of the surface of the detector and/or the beveled end of the fiber pigtail relative to each other and by tilting of the surface of the detector, which tilt may be pre-calculated and fixed or may be adjustable. Low reflection and essentially zero PDL also may be achieved at a coupler end of the fiber pigtail having an external optical fiber with a beveled end adjacent to the coupling end of the fiber pigtail having a complementary bevel. An intermediate ferrule is coupled between the coupling end of the fiber pigtail and an output ferrule. The bevels at each end of the intermediate ferrule have approximately the same angle, but are rotated approximately orthogonally to each other. The output ferrule has a corresponding bevel to that of the intermediate ferrule. The bevels reduce back reflections, while the orthogonal bevel interfaces act to zero out the PDL introduced by the bevels.

The objects, advantages and other novel features of the present invention are apparent from the following detailed description when read in conjunction with the appended claims and attached drawing.

DETAILED DESCRIPTION OF THE INVENTION

Figure 1:
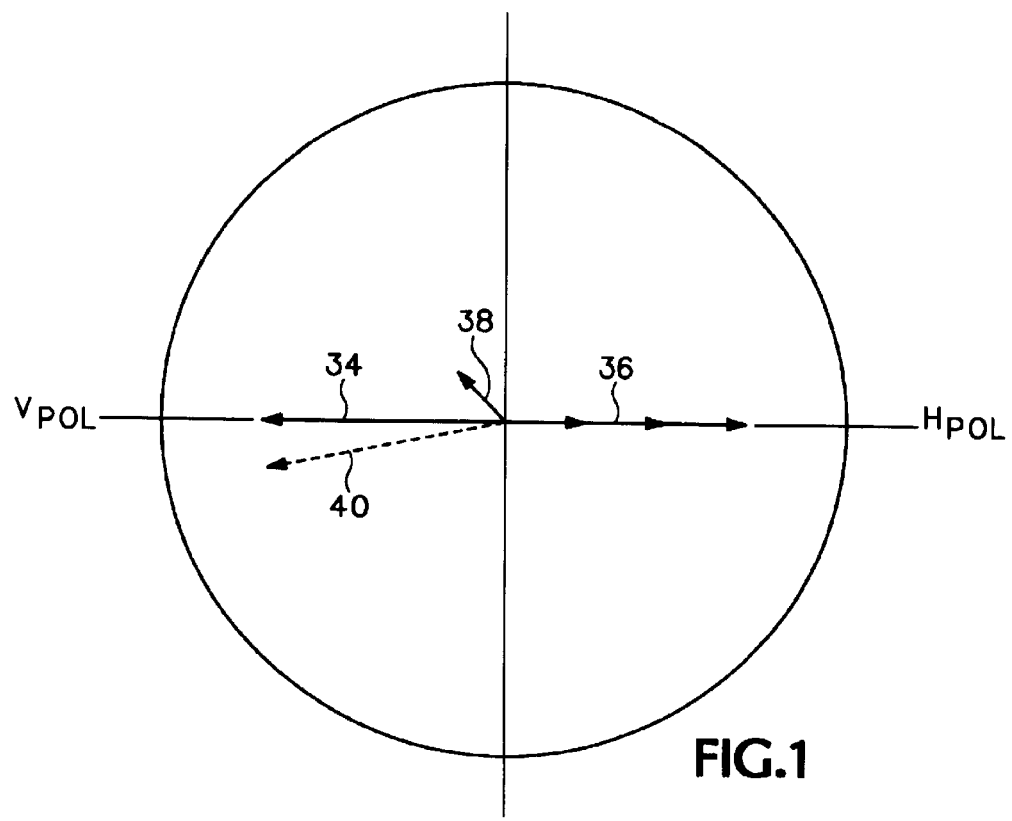
FIG. 1 is a vector diagram view illustrating PDL cancellation to minimize PDR according to the present invention.

As discussed above, merely butting a flat end of a fiber pigtail to a detection surface of an optical detector results in reflection from the flat end that is fed back to an optical source, resulting in unwanted modulation of the optical source. Also the additional reflection from the other end of the fiber pigtail which is coupled to an external optical fiber sets up a birefringent cavity which is polarization dependent, i.e., introduces polarization-dependent loss (PDL) in the fiber pigtail. Therefore to reduce back reflections the end of the fiber pigtail adjacent to the detection surface is beveled. However this introduces a fixed amount of PDL into the optical detector. This may be represented as a fixed vector 34 as shown in FIG. 1. Tilting the detector surface approximately orthogonal to the plane of the bevel of the fiber pigtail introduces a variable magnitude PDL as a function of the tilt angle in the opposite direction, as shown by the variable vector 36. There may be an additional, very small amount of variable PDL due to the orientation of the detector surface relative to the beveled end of the fiber pigtail, which is represented by a small dotted vector 38. This is compensated for by the rotation of the detector surface relative to the beveled end of the fiber pigtail to produce a new fixed PDL vector 40 which, when added to the small vector 38, produces a resultant vector along the axis. The resultant vector is compensated for by the variable vector 36 as described above to essentially eliminate PDL.

Figure 2:
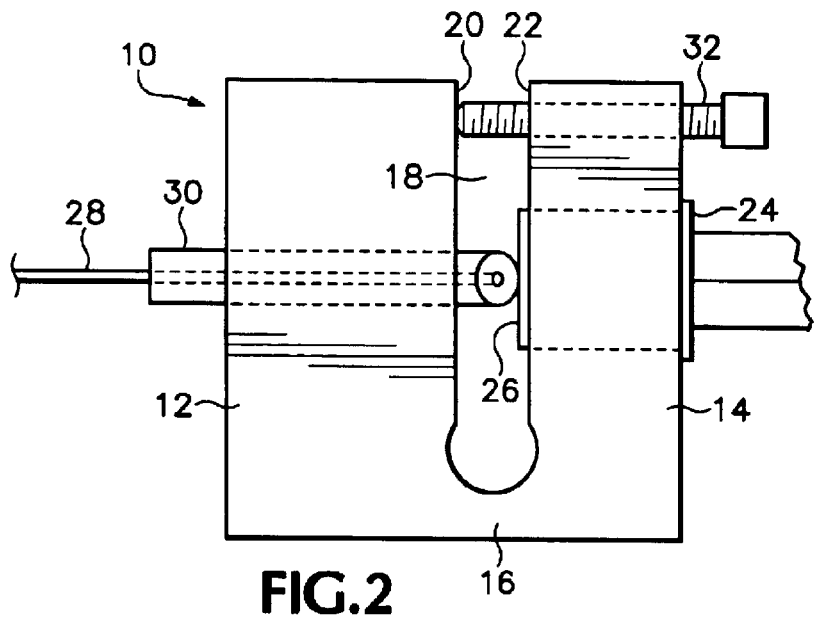
FIG. 2 is a side view of a fiber-pigtailed assembly according to the present invention.
Figure 3:
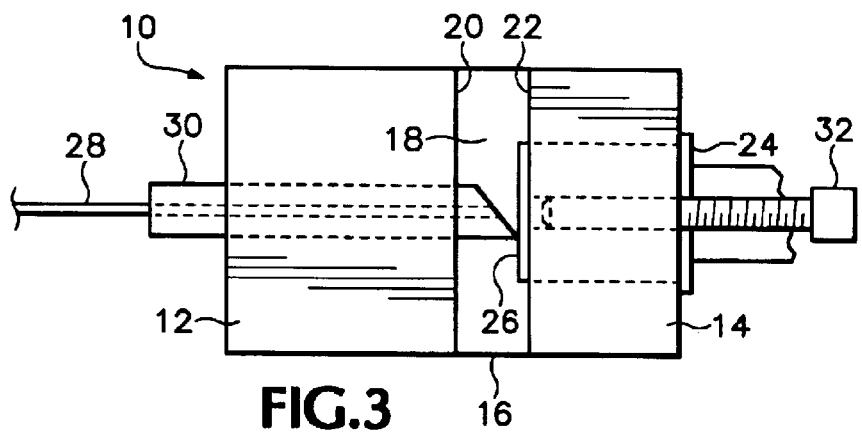
FIG. 3 is a top view of the fiber-pigtailed assembly of FIG. 2.
Figure 4:
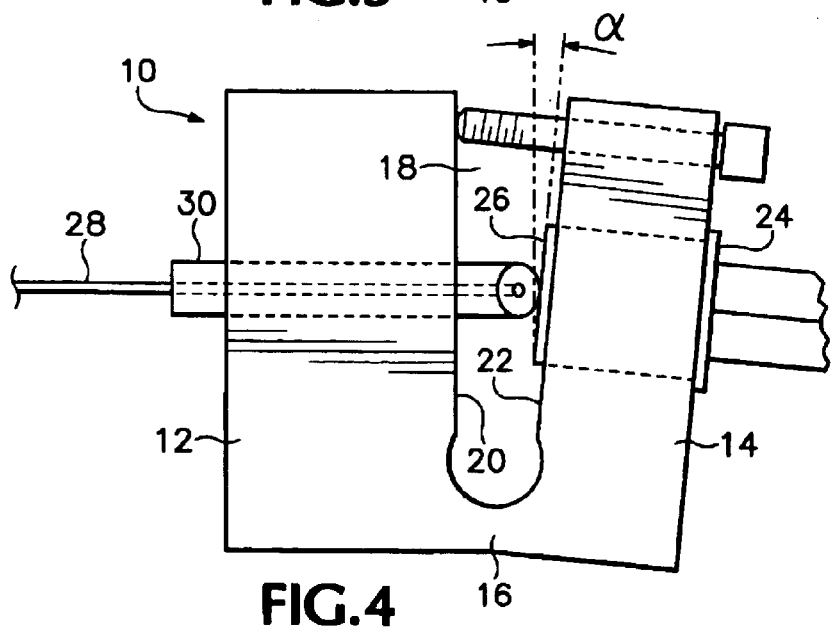
FIG. 4 is another side view of the fiber-pigtailed assembly illustrating tilt according to the present invention.
Figure 5:
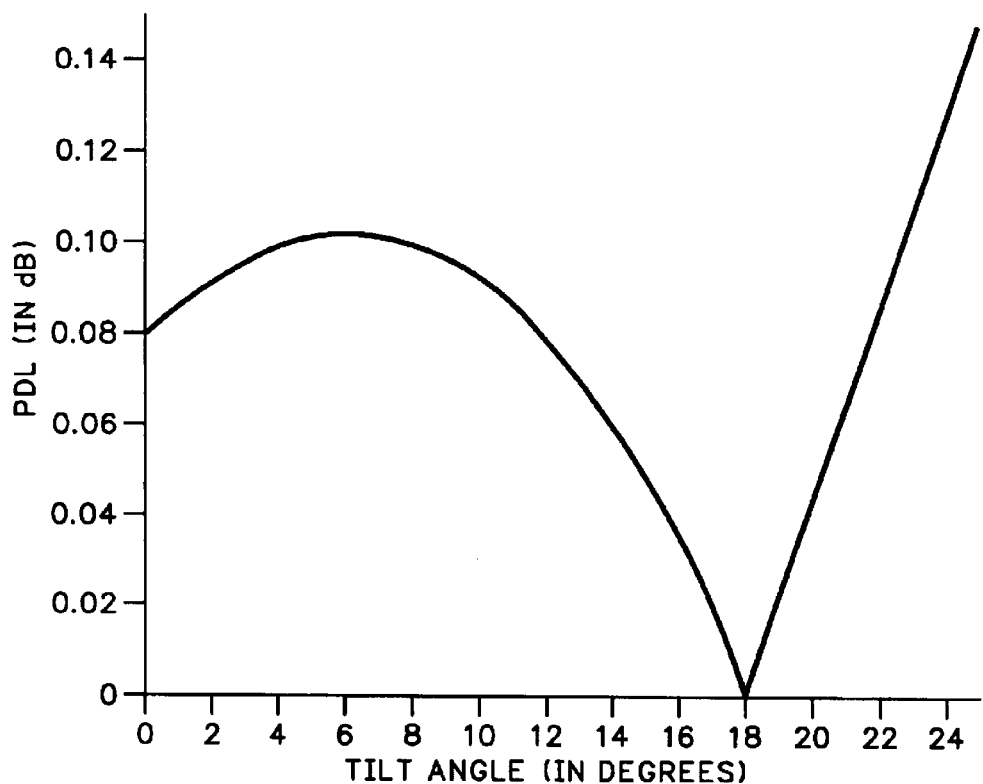
FIG. 5 is a graphic view showing the effect of detector tilt on PDL according to the present invention.

Referring now to FIGS. 2 and 3 one possible embodiment is shown having a housing 10 with a fiber holding portion 12 and an optical detector holding portion 14 coupled together by a connecting portion 16 so that there is an interior gap 18 between interior surfaces 20, 22. An optical detector 24 is mounted in the optical detector holding portion 14 so that its detection surface 26 faces the gap 18. An end of a fiber pigtail 28 is secured by a ferrule 30 in the fiber holding portion 12 such that the end is adjacent to the detection surface 26 in the gap 18. The end of the ferrule 30 and fiber pigtail 28 adjacent to the detection surface 26 is beveled at an angle. A means, such as a screw 32 through the optical detector holding portion 14 with its tip contacting the interior surface 20 of the fiber holding portion 12, may be provided to "tilt" the optical detector 24 relative to the end of the ferrule 30, as shown in FIG. 4, about a point in the connecting portion 16 that is in this instance flexible. Also the ferrule 30 may be rotated slightly to achieve an optimum position, as explained below, with the plane of the bevel being approximately orthogonal to the angle α of the tilt. For example if the bevel angle at the end of the ferrule 30 is 20 degrees, based on theoretical calculations and actual empirical data, to achieve essentially zero PDL requires a tilt for the optical detector 24 of about 17.96 degrees, as shown in FIG. 5, and a rotation of about −36.304 degrees. The rotation may be achieved by rotating the ferrule 30 rather than the detector 24. Whatever the bevel angle on the ferrule 30, there is some combination of tilt and rotation (equivalent to rotation of the detector 24) that results in essentially zero PDL. The result is to zero out (<0.001 dB) any polarization-dependent effects in the fiber-pigtailed assembly for the optical detector while having low back reflection (<−80 dB). The distance of the fiber pigtail 28 from the large-area detector surface 26 is dependent upon the spot size as a function of distance from the end of the fiber pigtail. Using a ray model for a large area detector surface 26 with a 500 micron area and a 62.5 micron cross-sectional area multi-mode fiber pigtail 28, the beveled end of the fiber pigtail should be within about 1.5 mm of the detector surface.

Figure 6:
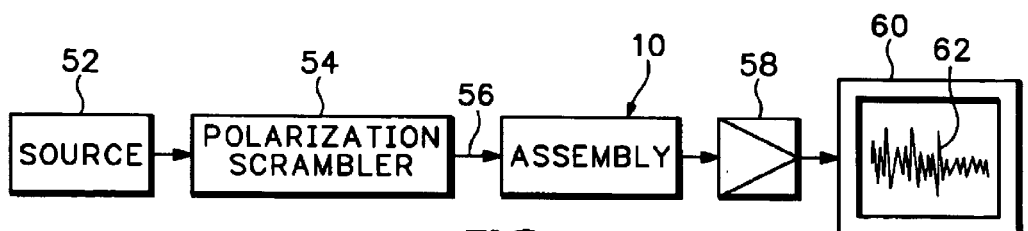
FIG. 6 is a block diagram view of a system for adjusting the fiber-pigtailed assembly according to the present invention.

Adjustment of the fiber-pigtailed optical detector may be achieved by providing, as shown in FIG. 6, a source of different polarization states of light, such as light from a laser source 52 through a polarization scrambler 54, in a short period of time (<<1 sec.) into an external optical fiber 56. The external optical fiber 56 is coupled to the fiber-pigtailed assembly 10 of the optical detector and the electrical output is amplified by an amplifier 58 and displayed on an oscilloscope 60. This provides an electrical signal 62 having a certain peak-to-peak amplitude. The ferrule 30 may be rotated to minimize the peak-to-peak amplitude, and then the tilt may be adjusted by the tilt means 32 to further minimize the peak-to-peak amplitude. These steps may be iterated as necessary to achieve a minimum peak-to-peak amplitude for the electrical signal 62 which represents essentially zero PDL. Where the housing 10 has a fixed tilt angle (based on pre-calculations) between the fiber and detector portions 12, 14 only rotation is adjusted, lessening the adjustment time in the manufacturing of the fiber pigtailed assembly.

Figure 7:
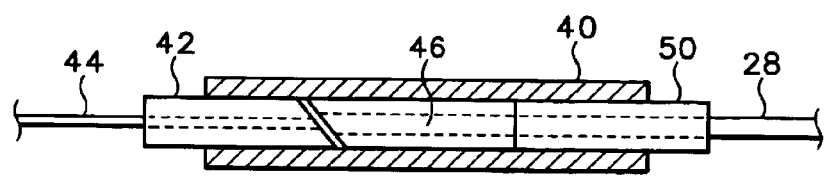
FIG. 7 is a partial cross-sectional top view of a fiber coupler for the fiber-pigtailed assembly according to the present invention.
Figure 8:
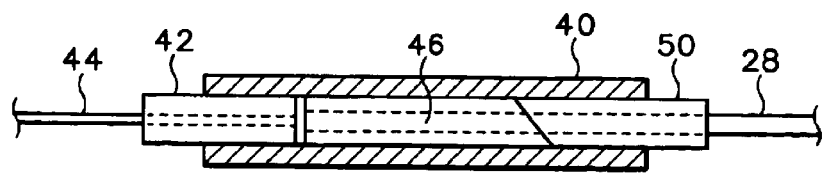
FIG. 8 is a partial cross-sectional side view of the fiber coupler of FIG. 7.
Figure 9:
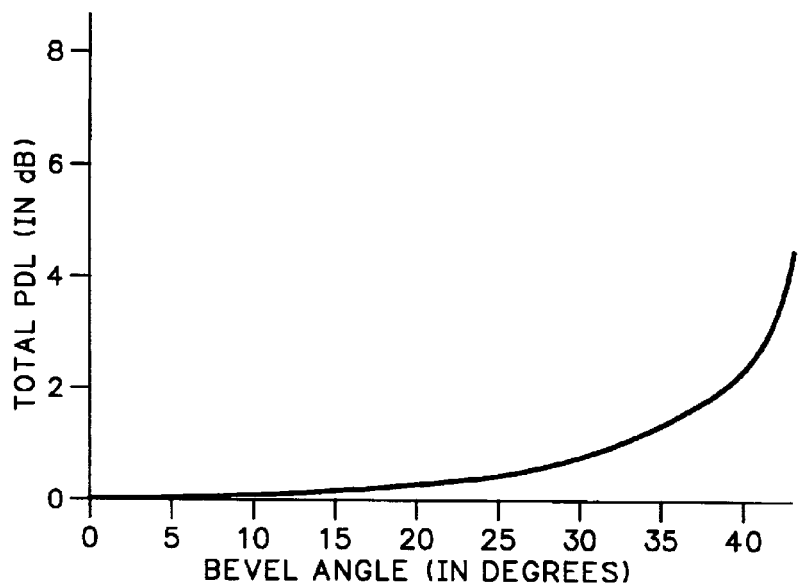
FIG. 9 is a graphic view illustrating the effect of bevel angle at the end of an optical fiber on PDL.
Figure 10:
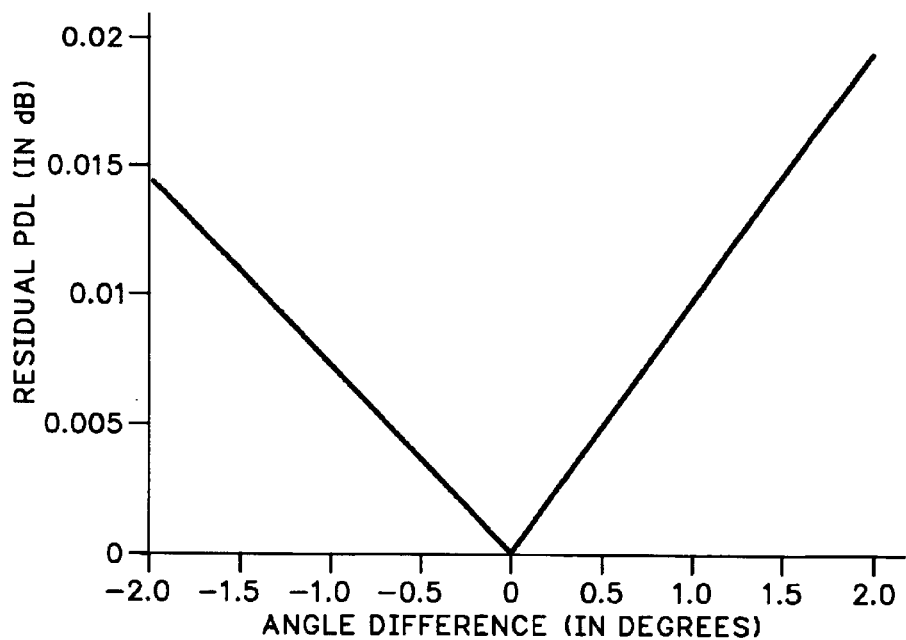
FIG. 10 is a graphic view illustrating the effect of the difference between bevel angles at opposite ends of an optical fiber on PDL.

In a test and measurement instrument another source of PDL and back reflection is the coupling of the external optical fiber, typically a smaller diameter single-mode fiber, to the fiber-pigtailed assembly. Current optical couplers provide physical contact between the external optical fiber and the fiber pigtail 28. It is desired also to have low back reflection and PDL at the coupler. The coupler described here may take the form of a sleeve 40, as shown in FIGS. 7 and 8, having three optical ferrules in series. An input ferrule 42 is attached to the end of an external optical fiber 44 of a system to be measured. The input ferrule 42 has a beveled end at the end of the external optical fiber 44. An intermediate ferrule 46 contains an optical fiber corresponding to the fiber pigtail 28 and has both ends beveled, with the bevels being in approximately orthogonal planes. The intermediate ferrule 46 is placed adjacent the input ferrule 42 so that the adjacent ends are parallel and close, but not necessarily in physical contact. Likewise an output ferrule 50 is provided on the coupling end of the fiber pigtail 28 adjacent to the intermediate ferrule 46, and also has a beveled end. The output ferrule 50 is placed adjacent to the intermediate ferrule 42 so that the beveled ends are parallel and preferably in physical contact. A non-contact coupling is preferred between the external optical fiber 44 and the optical fiber of the intermediate ferrule 46. FIG. 9 shows that for an interface between the ferrules 42, 46, 50 the PDL is a function of the bevel angle at the interface surface. As is apparent, to minimize PDL the bevel angle needs to be relatively small, but sufficient to reduce back reflection to specified limits. To essentially eliminate all PDL the four interfaces of the ferrules need to be accurately aligned. FIG. 10 shows the residual PDL in the intermediate ferrule 46 when the bevel angle for one pair of interfaces 42/46 is different from the bevel angle of the other pair 46/50. The objective is to have approximately 0.1 degree accuracy in maintaining a common bevel angle, such as 7 degrees for this example, and 0.9 degree accuracy in achieving the orthogonal configuration between the interfaces on opposing ends of the intermediate ferrule 46.

Coupling the external optical fiber 44, generally a smaller diameter single-mode fiber, to the optical fiber of the intermediate ferrule 46 requires alignment to within about 0.5 mm between the respective fibers based on the spot size from the smaller diameter fiber to the larger.

Although the drawing figures show a configuration where the housing 10 has two portions 12, 14 coupled by a connecting portion 16 that may be flexible so that the tilt of the optical detector 26 relative to the beveled end of the fiber ferrule 30 is adjustable, the housing may be rigid with a fixed angle of tilt for the detector and fiber ferrule based on pre-calculations, as indicated above. In that case only rotation of the fiber ferrule 30 is used to provide adjustment.

Thus the present invention provides a fiber-pigtailed assembly for an optical detector with minimal back reflection and PDR by having a detector end of an optical fiber with a bevel angle adjacent to the surface of the optical detector, the optical detector being tilted and rotated relative to the end of the optical fiber for both minimum back reflection and PDR, and may include having a coupling end of the optical fiber for the fiber-pigtailed assembly in a coupler having an intermediate ferrule with equal beveled angles on opposing ends situated orthogonally to each other such that they are parallel to respective ends of input and output ferrules of the coupler having matching bevel angles to couple light from an external optical fiber in the input ferrule to the optical fiber in the output ferrule for transmission to the detector.

What is claimed is:

1. A fiber pigtailed assembly for coupling light from an optical fiber to an optical detector comprising means for mounting the optical fiber adjacent to the optical detector, the optical fiber having a beveled end and having a diameter less than the area of a detector surface of the optical detector, so that the light along an optical axis from the beveled end directly impinges on the detector surface, the detector surface being tilted and being rotated about the optical axis with respect to the beveled end to produce essentially zero polarization-dependent responsivity and low back reflection.

2. The fiber pigtailed assembly as recited in claim 1 further comprising means for adaptively adjusting a tilt angle of the detector surface with respect to the beveled end.

3. The fiber pigtailed assembly as recited in claim 1 wherein the mounting means comprises a housing having a fiber holding portion and a detector holding portion coupled together by a connecting portion to form a gap the fiber and detector holding portions, the fiber holding, detector holding and connecting portions being an integral whole with the optical fiber being mounted in the fiber holding portion so that the beveled end extends into the gap and the optical detector being mounted in the detector holding portion so that the detector surface is adjacent and tilted and rotated with respect to the beveled end.

4. The fiber pigtailed assembly as recited in claim 3 further comprising means for adaptively adjusting a tilt angle of the detector surface with respect to the beveled end.

5. The fiber pigtailed assembly as recited in claim 4 wherein the adaptively adjusting means comprises:
the connection portion being flexible; and
means coupled to the housing for angularly varying the gap to adjust the tilt angle by rotating about a point in the connection portion.

6. The fiber pigtailed assembly as recited in claim 5 wherein the angularly varying means comprises a screw threaded through one of the fiber and detector holding portions to contact an opposing surface of the gap such that adjustment of the screw causes the gap to angularly widen.

7. The fiber pigtailed assembly as recited in any of claims 1–6 further comprising means for coupling an opposing end of the optical fiber to an external optical fiber with low back reflection and minimum polarization-dependent responsivity.

8. The fiber pigtailed assembly as recited in claim 7 wherein the coupling means comprises:
an input ferrule containing an end of the external optical fiber, the end being beveled;
an intermediate ferrule containing an intermediate optical fiber and having beveled ends arranged approximately orthogonal to each other;
an output ferrule containing the opposing end of the optical fiber, the opposing end being beveled; and
means for holding the input, intermediate and output ferrules in position relative to each other so that the respective beveled ends are parallel to each other.

9. The fiber pigtailed assembly as recited in claim 8 wherein the holding means further comprises a gap between the input ferrule and the intermediate ferrule when the diameter of the external optical fiber is less than the diameter of the intermediate optical fiber.

10. A coupler for coupling a fiber pigtailed assembly to an external optical fiber with low back reflectance and minimum polarization-dependent responsivity comprising:
an input ferrule containing an end of the external optical fiber, the end being beveled;
an intermediate ferrule containing an intermediate optical fiber, the intermediate optical fiber having opposing ends that are beveled in approximately orthogonal planes;
an output ferrule containing a coupling end of an optical fiber of the fiber pigtailed assembly, the coupling end being beveled; and
means for holding the input, intermediate and output ferrules in position relative to each other such that the respective beveled ends are parallel to each other.

11. The coupler as recited in claim 10 wherein the holding means further comprises a gap between the input ferrule and the intermediate ferrule when the diameter of the external optical fiber is less than the diameter of the intermediate optical fiber.

* * * * *